(12) United States Patent
Hamano

(10) Patent No.: US 9,564,752 B2
(45) Date of Patent: Feb. 7, 2017

(54) ELECTRONIC APPARATUS AND IMAGE FORMING APPARATUS

(71) Applicant: Toshihiro Hamano, Tokyo (JP)

(72) Inventor: Toshihiro Hamano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 533 days.

(21) Appl. No.: 14/249,302

(22) Filed: Apr. 9, 2014

(65) Prior Publication Data

US 2014/0306535 A1    Oct. 16, 2014

(30) Foreign Application Priority Data

Apr. 15, 2013 (JP) .................... 2013-084879
Mar. 11, 2014 (JP) .................... 2014-048182

(51) Int. Cl.
*H02J 4/00* (2006.01)
*H02H 9/00* (2006.01)

(52) U.S. Cl.
CPC ........... *H02H 9/001* (2013.01); *Y10T 307/549* (2015.04)

(58) Field of Classification Search
CPC ........................... H02H 9/001; Y10T 307/549
USPC ......................................................... 307/52
See application file for complete search history.

(56) References Cited

U.S. PATENT DOCUMENTS

2008/0061634 A1*  3/2008  Iwata ............... H01H 9/542
                                                          307/141

FOREIGN PATENT DOCUMENTS

JP     2005-302514    10/2005
JP     2008-066119    3/2008

* cited by examiner

*Primary Examiner* — Rexford Barnie
*Assistant Examiner* — Toan Vu
(74) *Attorney, Agent, or Firm* — Duft Bornsen & Fettig LLP

(57) ABSTRACT

An electronic apparatus comprises: a displacement unit provided to an electronic apparatus main body; a first power source provided to the main body and supplying power to a load provided to the displacement unit; a first connecting unit that opens and closes a first supply path supplying an electric current from the first power source to the load in response to displacement of the displacement unit; a limiting unit provided on the first supply path and limiting an electric current flowing through the first supply path for a predetermined time from when an electric current is supplied from a second power source; and a second connecting unit that opens and closes a second supply path supplying an electric current from the second power source to the limiting unit in response to the displacement, wherein the first connecting unit opens and closes the second supply path in response to the displacement.

7 Claims, 6 Drawing Sheets

ELECTRONIC APPARATUS AND IMAGE FORMING APPARATUS

CROSS-REFERENCE TO RELATED APPLICATIONS

The present application claims priority to and incorporates by reference the entire contents of Japanese Patent Application No. 2013-084879 filed in Japan on Apr. 15, 2013 and Japanese Patent Application No. 2014-048182 filed in Japan on Mar. 11, 2014.

BACKGROUND OF THE INVENTION

1. Field of the Invention

The present invention relates to an electronic apparatus and an image forming apparatus

2. Description of the Related Art

Devices such as a motor arranged on a substrate may possibly have voltage fluctuations (e.g., a voltage drop) caused by a starting current and a phenomenon of an electric current rushing from, for example, a capacitive load in which electric charges are accumulated (hereinafter, referred to as an inrush current) when the devices are started.

Widely known are a technology for providing a capacitor to a substrate to prevent a voltage drop caused by a starting current and a technology for providing an inrush current prevention circuit to prevent an inrush current flowing from, for example, a capacitor.

Japanese Patent Application Laid-open No. 2008-066119, for example, discloses an interlock apparatus. In the interlock apparatus, a resistance is connected in series with a first switch turned on and off in conjunction with a mechanical operation of an open-and-close unit or the like of electrical equipment to stop supplying power from a power supply to a load and to cancel the power supply stoppage. A second switch is connected in parallel to the resistance, and an on-detecting unit detects an on-operation of the first switch and then turns on the second switch when a predetermined time has passed after the detection of the on-operation.

In the case where a plurality of paths that transmit an electric current between a displacement unit provided displaceably with respect to a main body and the main body are each opened and closed in response to displacement of the displacement unit, an inrush current flow may not possibly be suppressed depending on a connection order of connecting units that open and close the paths.

In view of the disadvantage described above, there is a need to suppress an inrush current flow regardless of a connection order of connecting units that open and close a plurality of paths that transmit an electric current between a displacement unit provided displaceably with respect to a main body and the main body even when the paths are each opened and closed in response to displacement of the displacement unit.

SUMMARY OF THE INVENTION

It is an object of the present invention to at least partially solve the problems in the conventional technology.

According to the present invention, there is provided an electronic apparatus comprising: a displacement unit configured to be provided displaceably with respect to a main body of the electronic apparatus; a first power source configured to be provided to the main body and supply power to a load provided to the displacement unit; a first connecting unit configured to open and close a first supply path that supplies an electric current from the first power source to the load in response to displacement of the displacement unit; a limiting unit configured to be provided on the first supply path and limit an electric current flowing through the first supply path for a predetermined time from when an electric current being to be supplied to the limiting unit is supplied from a second power source different from the first power source; and a second connecting unit configured to open and close a second supply path that supplies an electric current from the second power source to the limiting unit of an electric current in response to displacement of the displacement unit, wherein the first connecting unit opens and closes the second supply path in response to displacement of the displacement unit.

The present invention also provides an image forming apparatus comprising: a main body of the image forming apparatus; a displacement unit configured to be provided displaceably with respect to the main body; a first power source configured to be provided to the main body and supply power to a load provided to the displacement unit; a first connecting unit configured to open and close a first supply path that supplies an electric current from the first power source to the load in response to displacement of the displacement unit; a limiting unit configured to be provided on the first supply path and limit an electric current flowing through the first supply path for a predetermined time from when an electric current being to be supplied to the limiting unit is supplied from a second power source different from the first power source; and a second connecting unit configured to open and close a second supply path that supplies an electric current from the second power source to the limiting unit in response to displacement of the displacement unit, wherein the first connecting unit opens and closes the second supply path in response to displacement of the displacement unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Background

Figure 1:
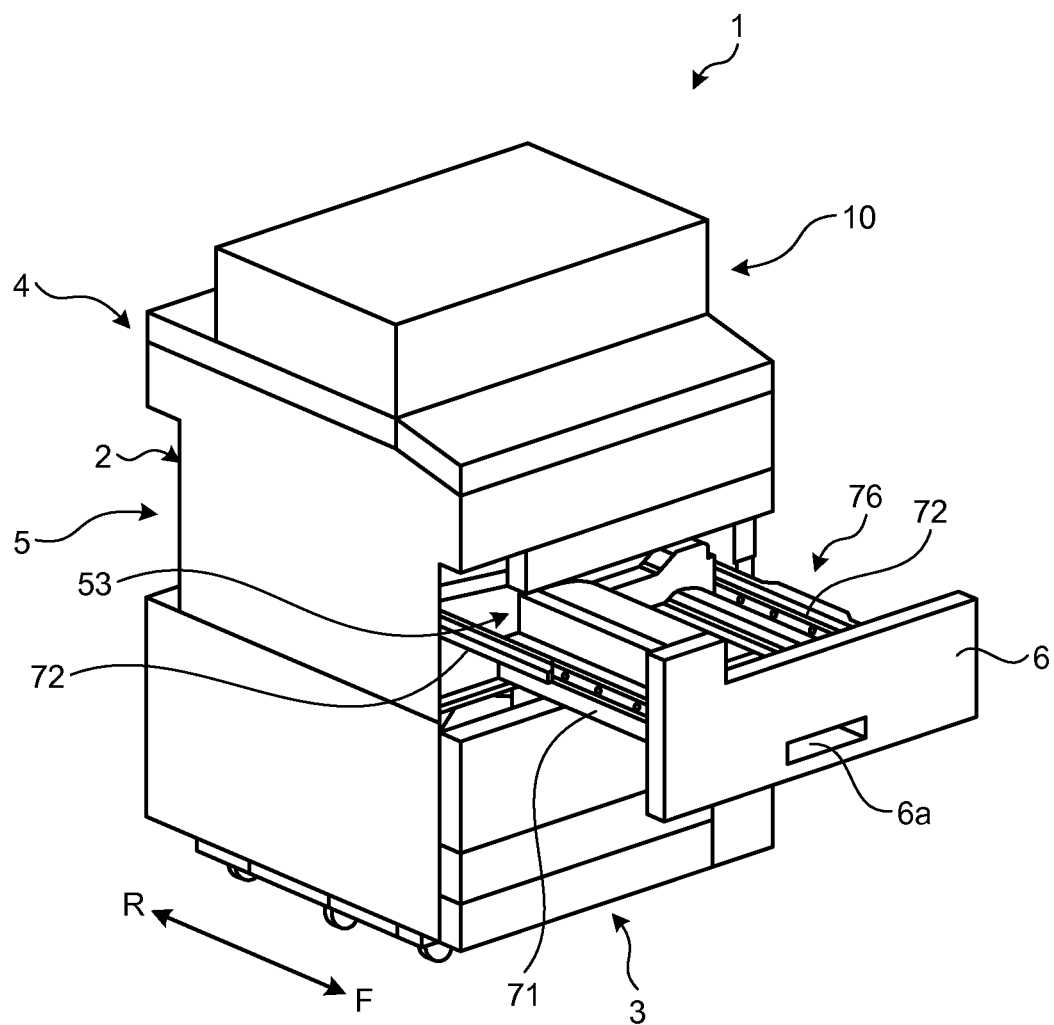
FIG. 1 is a schematic perspective view of an image forming apparatus.

A background of the present invention is described first. FIG. 1 is a schematic perspective view of an image forming apparatus 1. The image forming apparatus 1 includes an image forming apparatus main body (a main body) 2 and a drawer unit 76 provided drawably (displaceably in a horizontal direction, for example) with respect to the main body 2. In FIG. 1, a direction denoted by F corresponds to the front side of the image forming apparatus 1, whereas a direction denoted by R corresponds to the rear side thereof.

The main body 2 includes a scanner unit 10 that reads an image, a writing unit 4 that forms an image, a transfer unit 5 that transfers a formed image, and a paper feeding unit 3 that feeds a sheet for printing.

The drawer unit 76 is drawn to the front side along a slide rail 72 provided so as to allow the drawer unit 76 to be drawn from the main body 2. The drawer unit 76 is provided with a registration mechanism (not illustrated) that corrects skew of a sheet, a fixing unit 53 that fixes a toner transferred onto a sheet to the sheet, a drawer pull 6a used to draw the drawer unit 76, a carrier 71 supporting a reverse conveying path, which is not illustrated, and a drawer pull cover 6.

Figure 2A:
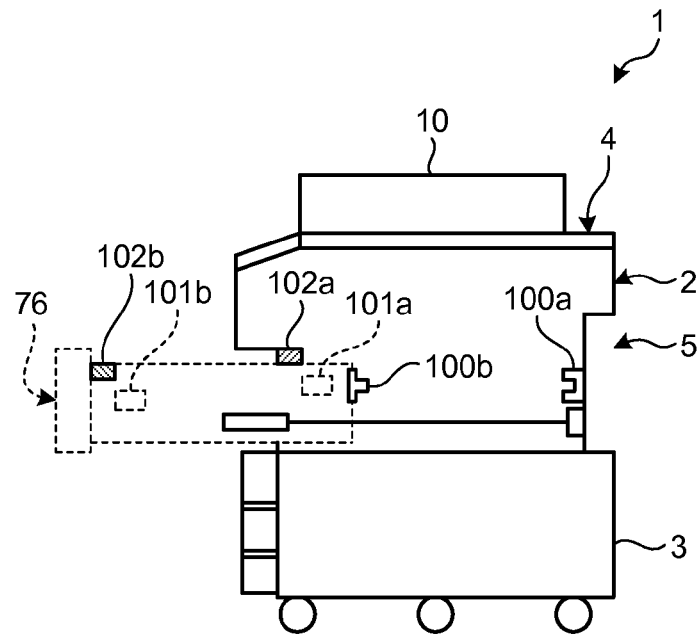
FIGS. 2A and 2B are schematics of a state where a drawer unit is displaced with respect to a main body of the image forming apparatus.
Figure 2B:
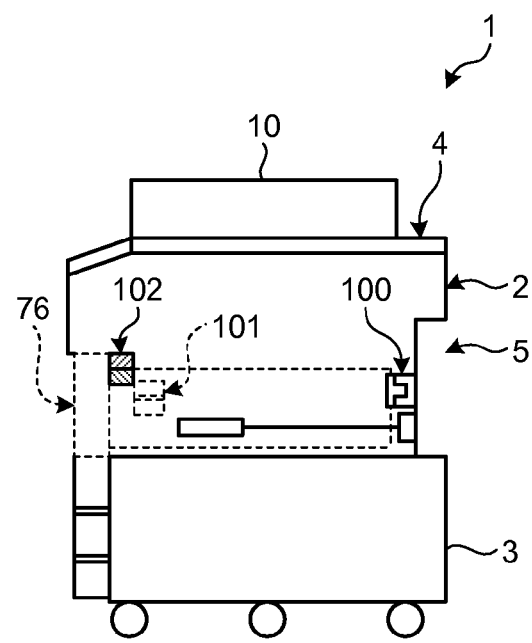

The following describes an operation to draw the drawer unit 76 from the main body 2. FIGS. 2A and 2B are schematics of a state where the drawer unit 76 is displaced with respect to the main body 2. FIG. 2A illustrates a state where the drawer unit 76 is drawn from the main body 2, whereas FIG. 2B illustrates a state where the drawer unit 76 is housed in the main body 2.

A first connecting unit 100 is, for example, a drawer connector that opens and closes to supply or cut an electric current to a device (not illustrated) such as a motor and a solenoid provided to the drawer unit 76. The first connecting unit 100 includes a connector 100a provided to the main body 2 and a connector 100b provided to the drawer unit 76. The first connecting unit 100 opens and closes in response to drawing (displacement) of the drawer unit 76.

Second connecting units 101 and 102 serve as an interlock mechanism. The second connecting unit 101 includes a contact (an interlock switch) 101a provided to the main body 2 and a contact 101b provided to the drawer unit 76. The second connecting unit 101 opens and closes in response to drawing (displacement) of the drawer unit 76. The second connecting unit 102 includes a contact 102a provided to the main body 2 and a contact 102b provided to the drawer unit 76. The second connecting unit 102 opens and closes in response to drawing (displacement) of the drawer unit 76.

As described above, the drawer unit 76 can be drawn along the slide rail 72. In other words, when the drawer unit 76 is housed in the main body 2, the first connecting unit 100 and the second connecting units 101 and 102 are closed (turned on), thereby forming a current supply path through which an electric current is supplied.

Figure 3:
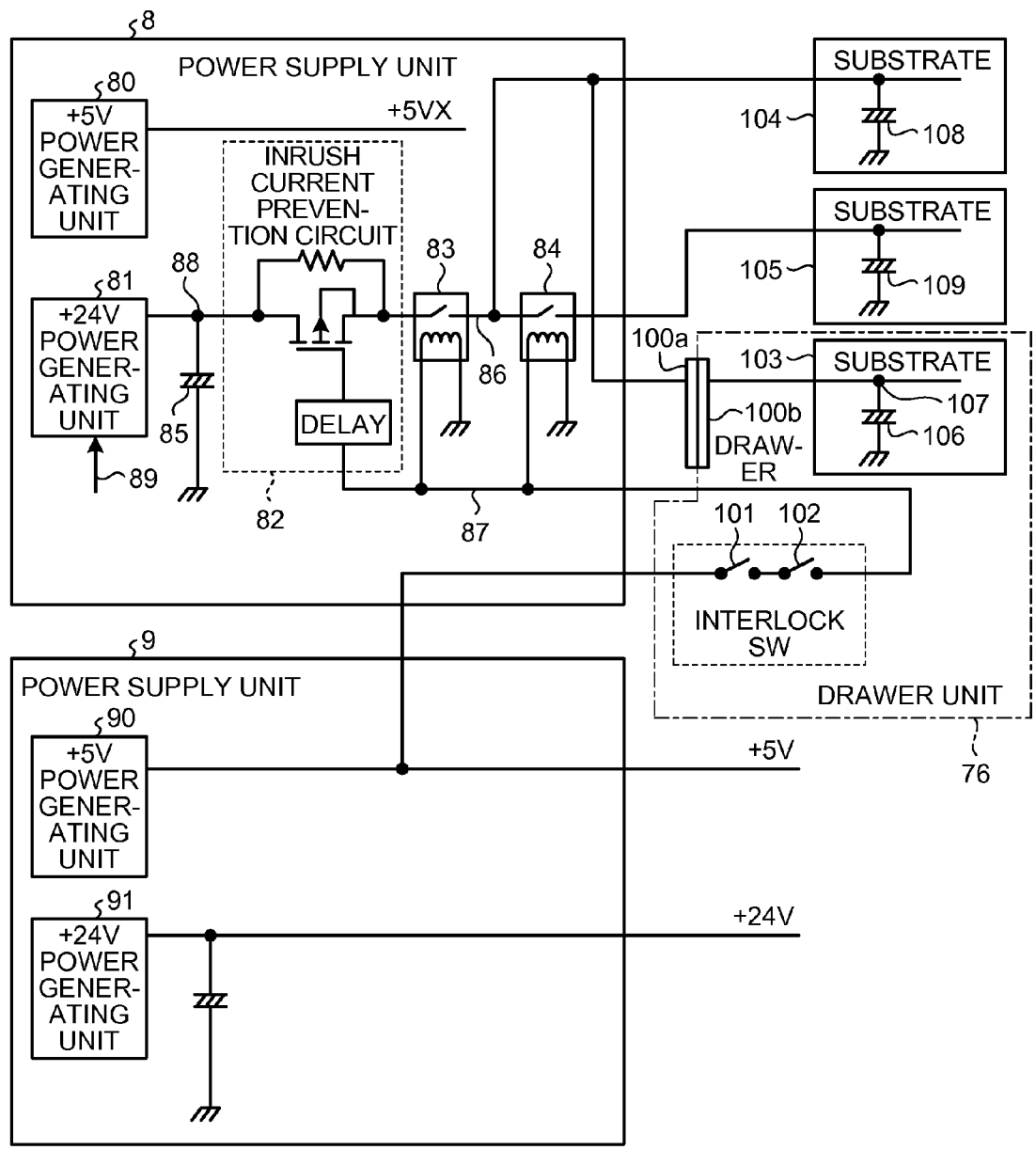
FIG. 3 is a diagram of a configuration of power supply units and the periphery thereof, the power supply units supplying power to the drawer unit.

FIG. 3 is a diagram of a configuration of power supply units 8 and 9 and the periphery thereof, the power supply units 8 and 9 supplying power (an electric current) to the drawer unit 76. The power supply unit 8 includes a 5V power generating unit 80, a 24V power generating unit (a first power source) 81, an inrush current prevention circuit 82, relays 83 and 84, and a capacitor 85. The 24V power generating unit 81 supplies power (an electric current) to a substrate 103, a substrate 104, and a substrate 105 provided to the drawer unit 76 via a first supply path 86. The inrush current prevention circuit 82 and the relays 83 and 84 serve as a limiting unit that limits an electric current flowing through the first supply path 86 for a predetermined period of time from the start of an operation.

The power supply unit 9 includes a 5V power generating unit (a second power source) 90 and a 24V power generating unit 91. The 5V power generating unit 90 supplies power to the limiting unit, thereby causing the limiting unit to start an operation. In other words, the inrush current prevention circuit 82 and the relays 83 and 84 start the operation when the 5V power generating unit 90 starts to supply power thereto. The second connecting units 101 and 102 open and close a second supply path 87 that supplies an electric current from the 5V power generating unit 90 to the limiting unit in response to displacement of the drawer unit 76.

The power supply unit 9, for example, constantly supplies power to the substrates 103, 104, and 105. The 24V power generating unit 81 of the power supply unit 8 supplies power or stop the supply of power to the substrates 103, 104, and 105 by means of an interlock function carried out by an operation of the second connecting units 101 and 102.

The substrates 103, 104, and 105 are substrates that drive a stepping motor and a direct-current (DC) brushless motor, which are not illustrated, for example. The substrates 103, 104, and 105 require a larger starting current at the start of driving the motor than in a usual rotating operation depending on the size and the control method of the motor. In such a case, a large current instantaneously flows, and a voltage exhibits a reverse behavior to that of the current, whereby voltage fluctuations (a voltage drop) occur. To prevent such an instantaneous voltage drop and maintain a stable voltage, substrates that control a motor are each equipped with a capacitor of a certain capacity or larger, thereby preventing the voltage drop. The substrates 103, 104, and 105 are equipped with capacitors 106, 108, and 109, respectively.

Specifically, when the drawer unit 76 is drawn, the second connecting units 101 and 102 open, and signals (current supply) to the relays 83 and 84 are turned off, thereby stopping supply of power to the subsequent paths after relay 83 to the substrates in the power supply unit 8. The power supply unit 8 may be configured such that opening of a front door or the like of the image forming apparatus 1 causes an interlock switch, which is not illustrated, similar to the second connecting unit 101 to open.

The power supply unit 8 suppresses an inrush current flowing into the substrates 103, 104, and 105 with the inrush current prevention circuit 82. The inrush current prevention circuit 82 includes a field-effect transistor (FET) component, a resistance for suppression of an inrush current, and a delay circuit. The inrush current prevention circuit 82 suppresses an inrush current generated by turning-on of the interlock mechanism.

An inrush current is generated as follows: when the relays 83 and 84 are closed to enable supply of an electric current to the substrates 103, 104, and 105, electric charges accumulated in the capacitor 85 provided to the power supply unit 8 rush into the capacitors 106, 108, and 109 of the substrates 103, 104, and 105, respectively. The inrush current is generated at a timing when the contacts of the relays 83 and 84 are each come into contact. The flow of the inrush current through the relays 83 and 84 melts and welds the contacts of the relays 83 and 84. Because the electric current singly flows in a short time, a voltage drop occurs in the power supply. If the voltage drops lower than a lower limit of the voltage monitored by a voltage monitoring integrated circuit (IC) (not illustrated), for example, the system may be reset. The inrush current prevention circuit 82 suppresses a peak voltage at the rushing of the inrush current generated in a short time. As a result, the inrush current prevention circuit 82 suppresses an electric current flowing through the contacts of the relays 83 and 84.

The inrush current prevention circuit 82 operates as follows. When the second connecting units 101 and 102 in the interlock mechanism close, the interlock is activated, thereby turning on the relays 83 and 84. The inrush current prevention circuit 82 also receives a signal to turn on the FET at the timing when the second connecting units 101 and 102 close. Because the delay circuit is arranged before the FET in the inrush current prevention circuit 82, the reception of the signal to turn on the FET is delayed by a predetermined time (e.g., approximately 50 ms).

In other words, when the relays 83 and 84 are turned on, the FET is not turned on in the inrush current prevention circuit 82. As a result, the inrush current flows into a resistance for suppression of an inrush current. The resistance of the inrush current prevention circuit 82 is a resistance of approximately 0.2Ω, for example. The inrush current prevention circuit 82 causes the inrush current to flow into the resistance in this manner, thereby suppressing the peak voltage. The inrush current prevention circuit 82 can reduce the value of the inrush current from approximately 120 A to 32.8 A, for example. This enables the electric current at the contacts of the relays 83 and 84 to fall within a rated range, thereby preventing the contacts from being welded.

Subsequently, the FET of the inrush current prevention circuit 82 is turned on by a signal delayed by the delay circuit. In other words, the inrush current prevention circuit 82 causes the inrush current to flow into the resistance for suppression of an inrush current during the delay time given by the delay circuit. After the inrush current flows, the inrush current prevention circuit 82 turns on the FET, thereby causing an electric current to flow into the FET.

The drawer unit 76 receives power and a control signal from the main body 2 via the first connecting unit 100 (connectors 100a and 100b). As described above, drawing the drawer unit 76 from the main body 2 separates the connector 100a from the connector 100b in the first connecting unit 100. When the drawer unit 76 is drawn from the main body 2, the second connecting units 101 and 102 are turned off (in an open state) to prevent live insertion and removal while the first supply path 86 is supplying power. When the drawer unit 76 is housed in the main body 2, the first connecting unit 100 and the second connecting units 101 and 102 are each connected and are turned on.

The turning-on of the second connecting units 101 and 102 (determination of activation of the interlock) is not necessarily simultaneous with the turning-on of the first connecting unit 100. The connectors 100a and 100b of the first connecting unit 100 may be engaged with each other after the turning-on of the second connecting units 101 and 102 because of a mechanical tolerance, for example.

In this case, a voltage is applied to the first supply path 86 in a state where the drawer unit 76 is drawn. If the drawer unit 76 is then stored swiftly, the problem of an inrush current does not occur.

By contrast, if the drawer unit 76 is stored slowly, the first connecting unit 100 is not connected while the second connecting units 101 and 102 are turned on for a certain period of time. In this case, electric charges are accumulated in the capacitors 108 and 109 of the substrates 104 and 105, respectively, thereby generating an inrush current. Because the inrush current prevention circuit 82 operates in the same manner as in the usual turning-on of the power, the inrush current flows into the substrates 104 and 105 with a suppressed peak voltage.

Because the first connecting unit 100 is not connected yet in the drawer unit 76 at this time, no power is supplied to the substrate 103, and no electric charge is accumulated in the capacitor 106. If the first connecting unit 100 is then connected, the substrate 103 and the first supply path 86 are connected. As a result, electric currents rush into the capacitor 106 in which no electric charge is accumulated from the capacitors 108 and 109 of the substrates 104 and 105, respectively, and the capacitor 85 of the power supply unit 8. Because the relays 83 and 84 and the inrush current prevention circuit 82 are already turned on in the power supply unit 8, no operation to suppress an inrush current is performed. In other words, an inrush current flows into the substrate 103. The current flowing into the substrate 103 is represented as an electric current (or a voltage) at a node 107 (refer to FIGS. 4 and 6). The voltage at an output terminal of the 24V power generating unit 81 is represented as a voltage at a node 88. An operation of the 24V power generating unit 81 is turned off (or on) by a trigger 89 serving as a control signal.

Figure 4:
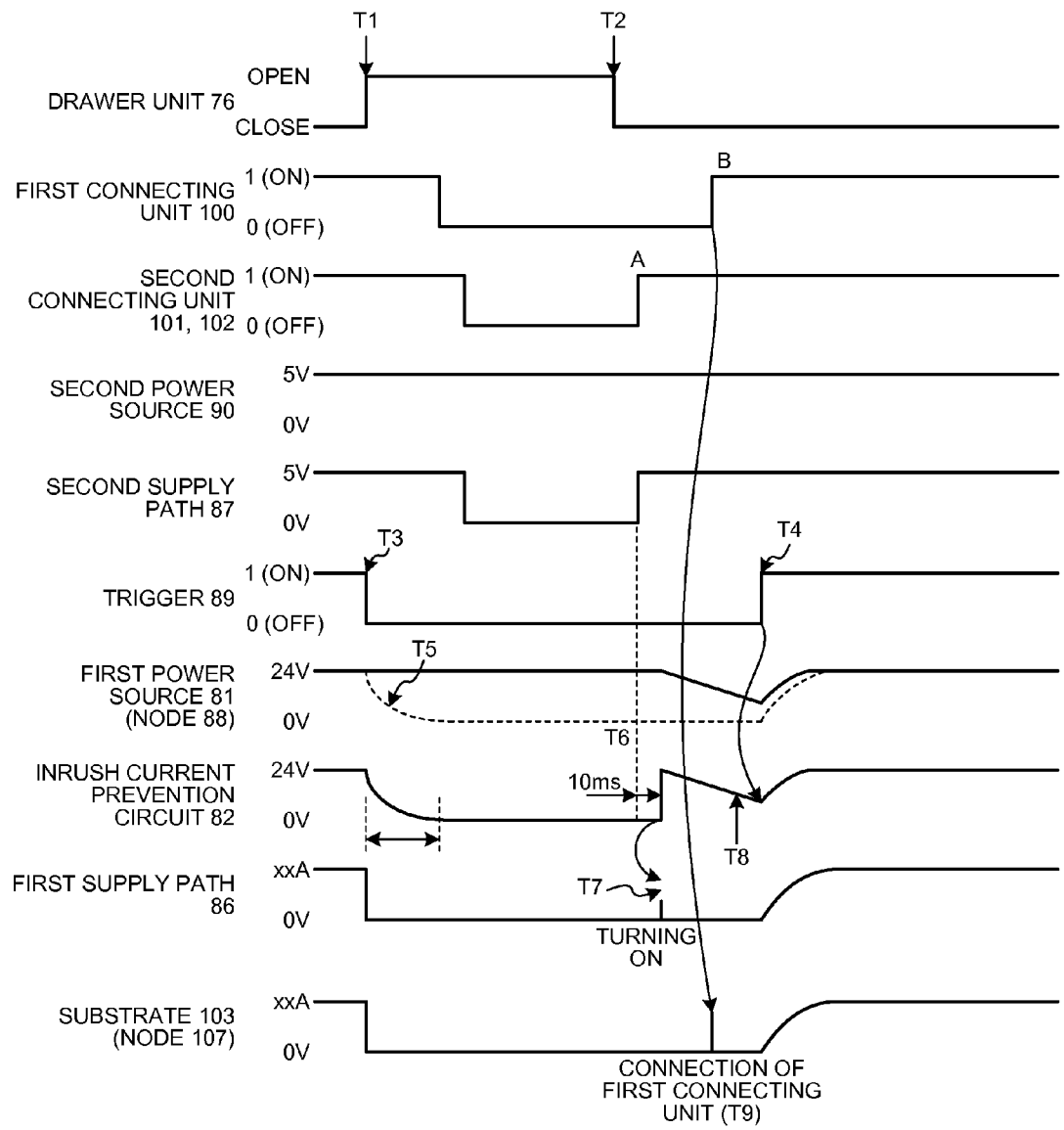
FIG. 4 is a timing chart of an operation timing of the power supply units and the periphery thereof illustrated in FIG. 3.

FIG. 4 is a timing chart of an operation timing of the power supply units 8 and 9 and the periphery thereof illustrated in FIG. 3. In FIG. 4, the drawer unit 76 is opened (timing T1) from a closed state and is then closed again (timing T2) with the other covers closed. The trigger 89 serving as a control signal is turned off (0) at a timing T3 when drawing of the drawer unit 76 is detected or when another cover is opened. If the drawing of the drawer unit 76 is detected and the trigger 89 is turned off, the output of the 24-V power generating unit (first power source) 81 approaches 0 V (timing T5). When the drawer unit 76 is housed at the timing T2, the voltage value of the second supply path 87 is changed to 5 V at a timing A when the second connecting units 101 and 102 are turned on. After a predetermined time (a contact operating time: 10 ms from a timing T6, for example) has passed, the inrush current prevention circuit 82 outputs a voltage of 24 V. At this timing T7, electric charges are accumulated in the capacitors 108 and 109 of the substrates 104 and 105, respectively, thereby generating an inrush current. In other words, an inrush current of residual charges remaining in the power supply unit 8 (electric charges accumulated in the capacitor 85) flows at the timing T7 when the relays 83 and 84 are turned on. The current value of the inrush current is reduced to approximately 32 A by the inrush current prevention circuit 82.

Subsequently, when the first connecting unit 100 is connected at a timing B, the inrush current prevention circuit 82 does not operate because it has already operated. As a result, an inrush current that gives the capacitor 106 of the substrate 103 an electric charge flows while the inrush current prevention circuit 82 are not operating (timing T9). The inrush current is generated by the residual charges remaining in the power supply unit 8 (electric charges accumulated in the capacitor 85) and residual charges of loads (the capacitor 108 and the capacitor 109) other than the power supply unit 8. The current value of the inrush current is a high value of approximately 120 A. The trigger 89 is turned on after the drawer unit 76 is housed (timing T4). The voltage output from the inrush current prevention circuit 82 starts to approach 24 V when the trigger 89 is turned on with the FET turned on (timing T8).

Embodiment

An image forming apparatus according to an embodiment of the present invention will now be described. The image forming apparatus according to the embodiment has the same configuration as that of the image forming apparatus 1 illustrated in FIG. 1, for example. Components of the image forming apparatus according to the embodiment substantially identical to those described above are denoted by like reference numerals (unless otherwise specified).

Figure 5:
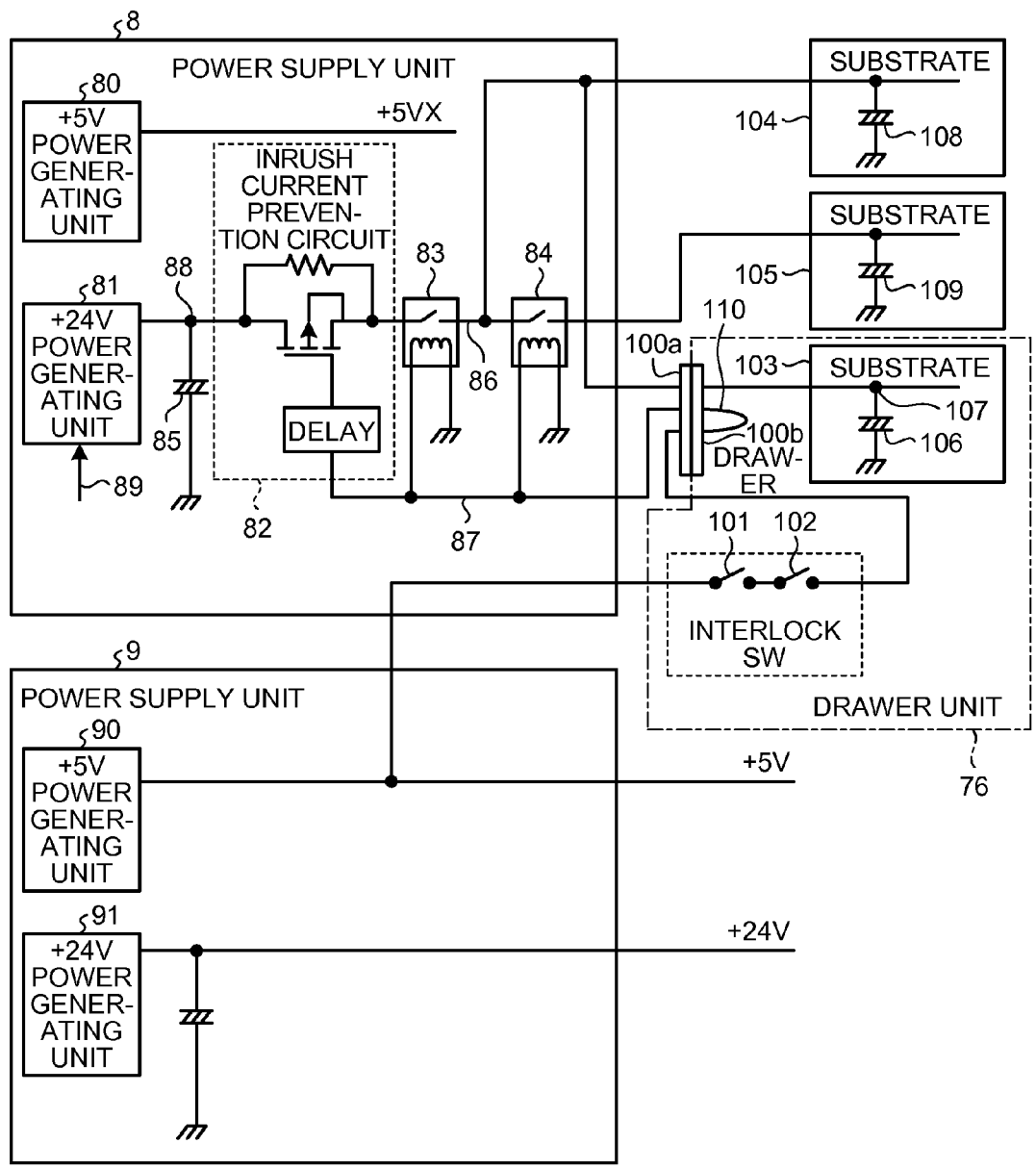
FIG. 5 is a diagram of a configuration of power supply units and the periphery thereof, the power supply units supplying power to a drawer unit, in an image forming apparatus according to an embodiment of the present invention.

FIG. 5 is a diagram of a configuration of power supply units 8 and 9 and the periphery thereof, the power supply units 8 and 9 supplying power (an electric current) to a drawer unit 76, in the image forming apparatus according to the embodiment. As described above, an inrush current prevention circuit 82 and relays 83 and 84 serve as a limiting unit that limits an electric current flowing through a first supply path 86 for a predetermined period of time from the start of an operation. A 5V power generating unit (a second power source) 90 supplies power to the limiting unit, thereby causing the limiting unit to start the operation.

In the image forming apparatus according to the embodiment, a first connecting unit 100 (connectors 100a and 100b) also opens and closes a second supply path 87 besides the first supply path 86 in response to displacement of the drawer unit 76. The first connecting unit 100 and second connecting units 101 and 102 are provided in series on the second supply path 87. The first connecting unit 100 uses a closed loop 110 formed on the connector 100b side on the second supply path 87, thereby operating to close the second supply path 87.

In other words, unless both the first connecting unit 100 and the second connecting units 101 and 102 are each connected, the inrush current prevention circuit 82 and the relays 83 and 84 keep the first supply path 86 opened (in a cutoff state).

Figure 6:
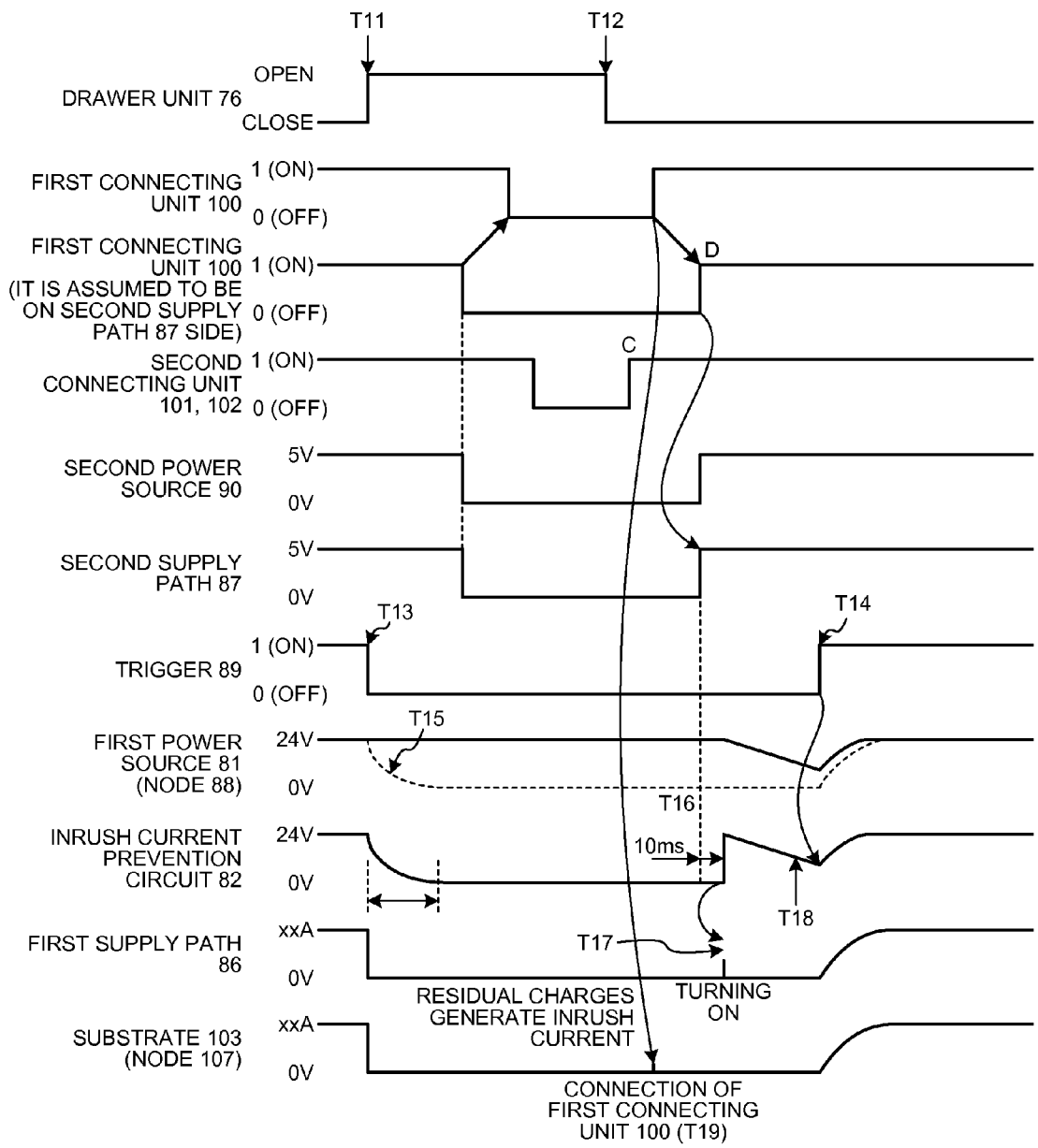
FIG. 6 is a timing chart of an operation timing of the power supply units and the periphery thereof illustrated in FIG. 5.

FIG. 6 is a timing chart of an operation timing of the power supply units 8 and 9 and the periphery thereof illustrated in FIG. 5. In FIG. 6, the drawer unit 76 is opened (timing T11) from a closed state and is then closed again (timing T12) with the other covers closed. The trigger 89 serving as a control signal is turned off (0) at a timing T13 when drawing of the drawer unit 76 is detected or when another cover is opened. If the drawing of the drawer unit 76 is detected and the trigger 89 is turned off, the output of a 24V power generating unit (a first power source) 81 approaches 0 V (timing T15). In the configuration illustrated in FIG. 5, the second connecting units 101 and 102 and the first connecting unit 100 are arranged in series. With this configuration, after the drawer unit 76 is housed at the timing T12 and the second connecting units 101 and 102 are turned on at a timing C, the voltage value of the second supply path 87 is not changed to 5 V. The voltage value of the second supply path 87 is changed to 5 V at a timing D when the first connecting unit 100 is turned on (connected). Because the second connecting units 101 and 102 are yet to be turned on at a timing T19 when the first connecting unit 100 is connected, the inrush current flowing into a substrate 103 at the time of connection is generated by electric charges accumulated in a capacitor 108 of a substrate 104 alone. The value of the inrush current is 10 A at the maximum, thereby causing no problem (timing T19). After a predetermined time (a contact operating time: 10 ms from a timing T16, for example) has passed after the voltage value of the second supply path 87 was changed to 5 V, the inrush current prevention circuit 82 outputs a voltage of 24 V.

At a timing T17, an electric current is supplied to the substrates 103, 104, and 105 via the first supply path 86. As a result, residual electric charges remaining in the power supply unit 8 (electric charges accumulated in a capacitor 85) are accumulated in capacitors 106, 108, and 109, thereby generating an inrush current. In other words, an inrush current of residual charges remaining in the power supply unit 8 (electric charges accumulated in the capacitor 85) flows at the timing T17 when the relays 83 and 84 are turned on. Because the inrush current prevention circuit 82 operates and causes the electric current to flow through a resistance from the timing T16 to the timing T17, the value of the inrush current at the timing T17 is reduced to approximately 32 A. The trigger 89 is turned on (timing T14) after the drawer unit 76 is housed. The voltage output from the inrush current prevention circuit 82 starts to approach 24 V when the trigger 89 is turned on with a FET turned on (timing T18).

Also in the case where the first connecting unit 100 is connected first and the second connecting units 101 and 102 are then connected, the inrush current prevention circuit 82 similarly operates. If neither the first connecting unit 100 nor the second connecting units 101 and 102 are connected, the 24V power generating unit 81 does not start to supply power to the substrate 103, and the inrush current prevention circuit 82 does not start to operate either. This makes it possible to suppress an inrush current flowing into the substrate 103.

As described above, the image forming apparatus according to the embodiment can suppress an inrush current flow regardless of a connection order of the first connecting unit 100 and the second connecting units 101 and 102 that open and close the first supply path 86 and the second supply path 87 even when the first supply path 86 and the second supply path 87 that transmit an electric current between the drawer unit 76 provided displaceably with respect to the main body 2 and the main body 2 are each opened and closed in response to displacement of the drawer unit 76.

The explanation has been mainly made of a specific example in which the drawer unit 76 provided displaceably with respect to the image forming apparatus 1 serves as the displacement unit in the embodiment, the embodiment is not limited thereto. The present invention is also applicable to other electronic apparatuses that supply an electric current to a displacement unit provided displaceably with respect to a main body, for example. The displacement unit is not necessarily displaced in parallel with respect to the main body and may be displaced in an opening and closing manner, for example.

The present invention can suppress an inrush current flow regardless of a connection order of connecting units that open and close a plurality of paths that transmit an electric current between a displacement unit provided displaceably with respect to a main body and the main body even when the paths are each opened and closed in response to displacement of the displacement unit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An electronic apparatus comprising:
 a drawer unit configured to be provided drawable from a main body of the electronic apparatus main body;
 a first power source configured to be provided to the main body and supply power to a load provided to the drawer unit;

a first connecting unit configured to open and close a first supply path that supplies an electric current from the first power source to the load in response to displacement of the drawer unit;

a limiting unit configured to be provided on the first supply path and limit an electric current flowing through the first supply path for a predetermined time from when an electric current being to be supplied to the limiting unit is supplied from a second power source different from the first power source; and a second connecting unit configured to open and close a second supply path that supplies an electric current from the second power source to the limiting unit of an electric current in response to displacement of the drawer unit, wherein the first connecting unit opens and closes the second supply path in response to displacement of the drawer unit.

2. The electronic apparatus according to claim 1, wherein the first connecting unit and the second connecting unit are provided in series on the second supply path.

3. The electronic apparatus according to claim 1, wherein the first connecting unit uses a closed loop on the second supply path provided to the drawer unit, thereby closing the second supply path.

4. The electronic apparatus according claim 1, wherein the drawer unit is moved parallel or is opened and closed with respect to the electronic apparatus main body.

5. The electronic apparatus according to claim 1, further comprising an opening and closing unit configured to be arranged on the first path and comes into a closed state when receiving an electric current from the second power source.

6. The electronic apparatus according to claim 1, wherein the first connecting unit and the second connecting unit come into a closed state when the drawer unit is housed in the electronic apparatus main body.

7. An image forming apparatus comprising:

a main body of the image forming apparatus;

a displacement unit configured to be provided displaceably with respect to the main body;

a first power source configured to be provided to the main body and supply power to a load provided to the displacement unit;

a first connecting unit configured to open and close a first supply path that supplies an electric current from the first power source to the load in response to displacement of the displacement unit;

a limiting unit configured to be provided on the first supply path and limit an electric current flowing through the first supply path for a predetermined time from when an electric current being to be supplied to the limiting unit is supplied from a second power source different from the first power source; and a second connecting unit configured to open and close a second supply path that supplies an electric current from the second power source to the limiting unit in response to displacement of the displacement unit, wherein the first connecting unit opens and closes the second supply path in response to displacement of the displacement unit.

* * * * *